United States Patent
Kobayashi

(10) Patent No.: US 6,615,689 B2
(45) Date of Patent: Sep. 9, 2003

(54) NON-LUBRICATED WAVE GEAR DEVICE

(75) Inventor: Masaru Kobayashi, Nagano-ken (JP)

(73) Assignee: Harmonic Drive Systems, Inc., Tokyo (JP)

( * ) Notice: Subject to any disclaimer, the term of this patent is extended or adjusted under 35 U.S.C. 154(b) by 0 days.

(21) Appl. No.: 10/146,928

(22) Filed: May 17, 2002

(65) Prior Publication Data

US 2002/0174741 A1 Nov. 28, 2002

(30) Foreign Application Priority Data

May 23, 2001 (JP) ........................................ 2001-154330

(51) Int. Cl.[7] ............................................. F16H 49/00
(52) U.S. Cl. .......................................................... 74/640
(58) Field of Search ........................................... 74/640

(56) References Cited

U.S. PATENT DOCUMENTS 5,482,602 A * 1/1996 Cooper et al. .......... 204/192.11
5,934,157 A * 8/1999 Kobayashi et al. ........... 74/640

FOREIGN PATENT DOCUMENTS

| JP | 09-250609 | 9/1997 |
| JP | 09-250610 | 9/1997 |
| JP | 09-259611 | 9/1997 |

* cited by examiner

*Primary Examiner*—Sherry Estremsky
(74) *Attorney, Agent, or Firm*—Burns, Doane, Swecker & Mathis, L.L.P.

(57) ABSTRACT

A wave gear device does not need to be lubricated. In a cup-shaped wave gear device 1, the inner ring 43 and balls 45 of the wave bearing 42 of the wave generator 4 are made of a ceramic material, while the outer ring 44 of the wave bearing 42 is made of SUJ2 or stainless steel. A DLC coating 302 is formed by a DLC coating process on a rolling surface 48 formed in the inner circumferential surface of the outer ring 44, a DLC coating 303 is formed by a DLC coating process on a rolling surface 47 in the outer circumferential surface of the inner ring 43, and DLC coatings 304 are formed by a DLC coating process on the surfaces of the balls 45. With this, non-lubricated wave gear device can be obtained. Since the agitating resistance of a lubricant can also be eradicated from these parts of the wave bearing, a large decrease can be made in the power loss ratio.

9 Claims, 5 Drawing Sheets

NON-LUBRICATED WAVE GEAR DEVICE

This application claims priority under 35 U.S.C. §§119 and/or 365 to JP2001-154330 filed in Japan on May 3, 2001; the entire content of which is hereby incorporated by reference.

BACKGROUND OF THE INVENTION

1. Field of the Invention

The present invention relates to a non-lubricated wave gear device.

2. Related Art

A wave gear device usually includes a ring-shaped rigid internal gear, a flexible external gear that is shaped like a ring and is disposed on an inside of the rigid internal gear, and a wave generator that is fitted into an inside of the flexible external gear. The wave generator is composed of a rigid wave plug with an elliptical outline and a wave bearing that is fitted on an outer circumferential surface of the wave plug, so that the flexible external gear is flexed into an elliptical shape and the external teeth thereof that are positioned at both ends of the major axis of the elliptical shape engage the internal teeth of the rigid internal gear.

When the wave generator is rotated by a motor or the like, the engaging parts of both gears move in a circumferential direction. Since there is a difference in the number of teeth between the external teeth and the internal teeth, relative rotation occurs between the gears in accordance with the difference in the number of teeth. Typically, the difference in the number of teeth is two, and the rigid internal gear is fixed to a device housing or the like, so that a rotational output of significantly reduced speed is obtained from the flexible external gear based on the difference in the number of teeth.

In a wave gear device of the above structure, a lubricant is supplied to the engaging toothed parts of both gears, frictional sliding parts present between the external gear and the wave generator, and frictional sliding parts of the wave bearing of the wave generator. Examples of lubrication mechanisms for such parts are disclosed by JP-A 09-250609, JP-A 09-250610, and JP-A 09-250611.

However, depending on where the wave gear device is used, there are cases where lubricants cannot be used.

In cases where it is necessary to avoid environmental pollution, such as when the wave gear device is used in a clean room, or when the wave gear device is used in a vacuum, it is necessary to take measures, such as attaching a sealing mechanism, to stop the lubricant from leaking out to the periphery.

When the operating conditions of the wave gear device are severe, it is common for the contact surfaces of the external gear and the wave generator to be insufficiently lubricated. When these contact surfaces are insufficiently lubricated, a large thrust force operates on these contact surfaces, resulting in increases in the generation of heat and abrasion. This causes damage such as scorching.

Also, the agitating resistance of the lubricant that lubricates the frictional sliding parts of the wave bearing, which is attached to the outer circumference of the wave generator to allow relative rotation of the external gear and the wave generator, is high and is responsible for a large proportion of the power loss of the wave gear device.

SUMMARY OF THE INVENTION

An object of the present invention is to provide a wave gear device that is suited to use in environments where it is preferable not to use lubricants.

It is a second object of the present invention to provide a wave gear device where the frictional surfaces between the external gear and the wave generator can be sufficiently lubricated.

It is a third object of the present invention to provide a wave gear device that can avoid power loss due to agitating resistance of the lubricant used to lubricate the wave bearing of a wave generator.

In order to achieve the above and other objects, according to the present invention, there is provided a lightweight wave gear device, which comprises a ring-shaped rigid internal gear, a ring-shaped flexible external gear, and a wave generator for flexing the external gear in a radial direction to partially engage it with the internal gear, and for moving engaging parts of the internal gear and the external gear in a circumferential direction. The internal gear is made of a high-strength aluminum alloy or a copper alloy, and the external gear is made of structural steel or stainless steel. A plated coating of a hard material is formed on tooth surfaces of the internal gear by electroless plating, a DLC (Diamond Like Carbon) coating is laminated on a surface of the plated coating by a DLC coating process, and a DLC coating is formed on tooth surfaces of the external gear by a low-temperature DLC coating process.

Typically, the wave generator includes a rigid wave plug and a wave bearing that is fitted between an outer circumferential surface of the wave plug and an inner circumferential surface of the external gear. The wave bearing comprises a flexible outer ring whose outer circumferential surface contacts an inner circumferential surface of the external gear, an inner ring whose inner circumferential surface contacts an outer circumferential surface of the wave plug, and a plurality of rolling bodies that are inserted between the outer ring and the inner ring and are free to roll.

In this case, it is preferable for the outer ring of the wave generator to be made of SUJ2, stainless steel or beryllium copper. It is preferable that an inner circumferential surface of the external gear is formed with one of (i) an oxidized coating formed by a steam treatment, (ii) a DLC coating formed by a DLC coating process, (iii) an iron sulfide coating formed by a sulfurizing treatment, and (iv) an iron oxide coating formed by a steam treatment and a nitriding process. It is also preferable that the outer ring is formed on its outer circumferential surface with a DLC coating by a DLC coating process.

It is also preferable that the plurality of rolling bodies of the wave generator are made of a ceramic material, stainless steel or SUJ2. The inner ring of the wave generator is preferably made of SUJ2, stainless steel, beryllium copper, or ceramic material. While, it is preferable that a DLC coating by a DLC coating process is formed on a rolling surface portion in an inner circumferential surface of the outer ring, and that surfaces of the rolling bodies are formed with a DLC coating by a DLC coating process.

It is also preferable for the wave plug to be made of an aluminum alloy or a copper alloy.

In another aspect of the present invention, there is provided a wave gear device which has a ring-shaped rigid internal gear, a ring-shaped flexible external gear, and a wave generator that flexes the external gear in a radial direction and has the external gear partially engage the internal gear and that moves engaging parts of the internal gear and the external gear in a circumferential direction. In this wave gear device, the external gear is made of structural steel or stainless steel. The wave generator has a rigid wave plug and a wave bearing that is fitted between an outer circumferential surface of the wave plug and an inner circumferential surface of the external gear, wherein the wave bearing has a flexible outer ring whose outer circumferential surface contacts the inner circumferential surface of the external gear, an inner ring whose inner circumferential surface contacts the outer circumferential surface of the wave plug, and a plurality of rolling bodies that are inserted between the outer ring and the inner ring and are free to roll. The outer ring of the wave generator is made of SUJ2, stainless steel, or beryllium copper. The external gear has an inner circumferential surface formed with one of (i) an oxidized coating formed by a steam treatment, (ii) a DLC coating formed by a DLC coating process, (iii) an iron sulfide coating formed by a sulfurizing treatment, and (iv) an iron oxide coating formed by a steam treatment and a nitriding process. The outer ring has an outer circumferential surface formed with a DLC coating by a DLC coating process.

In yet another aspect of the present invention, there is provided a wave gear device which comprises a ring-shaped rigid internal gear, a ring-shaped flexible external gear, and a wave generator that flexes the external gear in a radial direction and has the external gear partially engage the internal gear, and that moves engaging parts of the internal gear and the external gear in a circumferential direction. In this wave gear device, the wave generator includes a rigid wave plug and a wave bearing that is fitted between an outer circumferential surface of the wave plug and an inner circumferential surface of the external gear. The wave bearing has a flexible outer ring whose outer circumferential surface contacts the inner circumferential surface of the external gear, an inner ring whose inner circumferential surface contacts the outer circumferential surface of the wave plug, and a plurality of rolling bodies that are inserted between the outer ring and the inner ring and are free to roll. The outer ring of the wave generator is made of SUJ2, stainless steel, or beryllium copper; the plurality of rolling bodies of the wave generator are made of a ceramic material, stainless steel, or SUJ2; and the inner ring of the wave generator is made of SUJ2, stainless steel, beryllium copper, or a ceramic material. A DLC coating is formed by a DLC coating process on a rolling surface portion formed in an inner circumferential surface of the outer ring; a DLC coating is formed by a DLC coating process on a rolling surface portion formed in an outer circumferential surface of the inner ring; and DLC coatings are formed by a DLC coating process on surfaces of the rolling bodies.

Here, it is preferable for the wave plug to be made of an aluminum alloy or a copper alloy.

DESCRIPTION OF THE PREFERRED EMBODIMENTS

Referring now to the attached drawings, the present invention will be described in detail.

Figure 1:
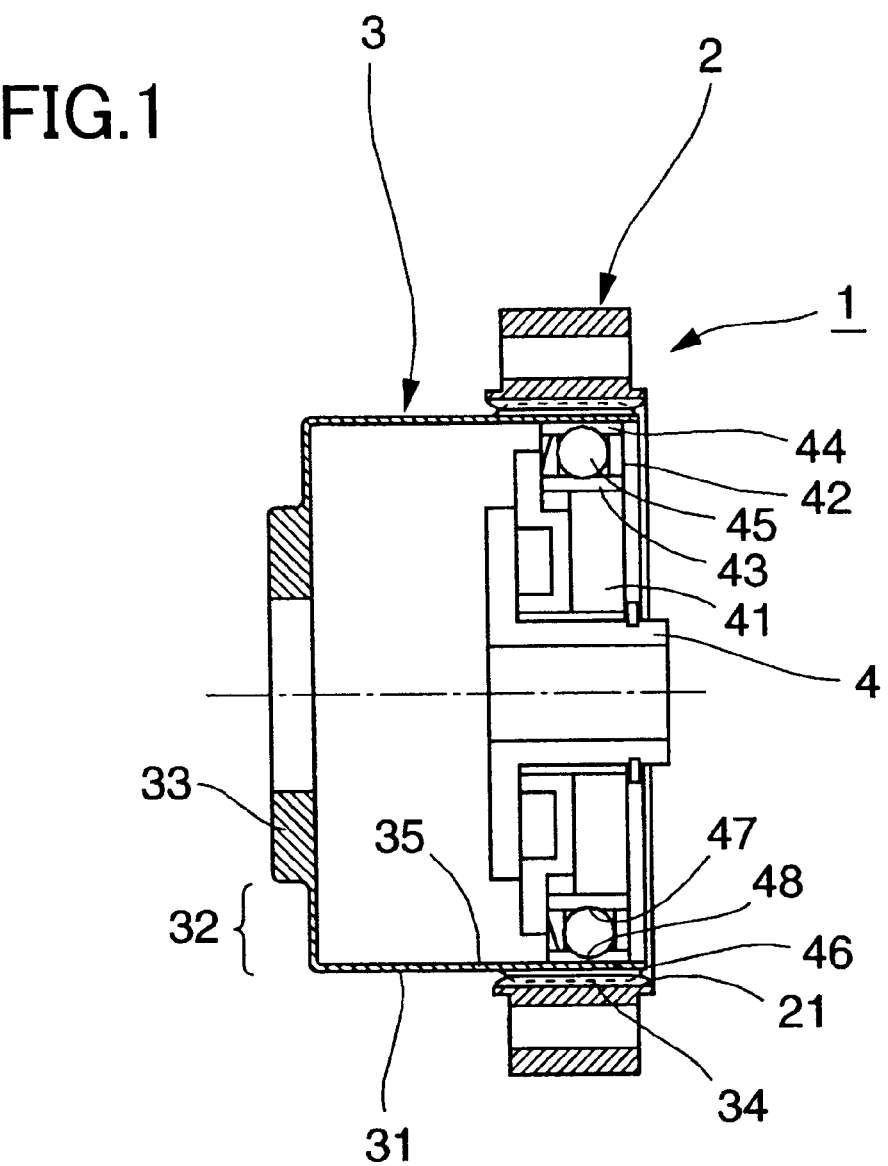
FIG. 1 is a longitudinal sectional view showing a cup-shaped wave gear device to which the present invention can be applied.
Figure 2:
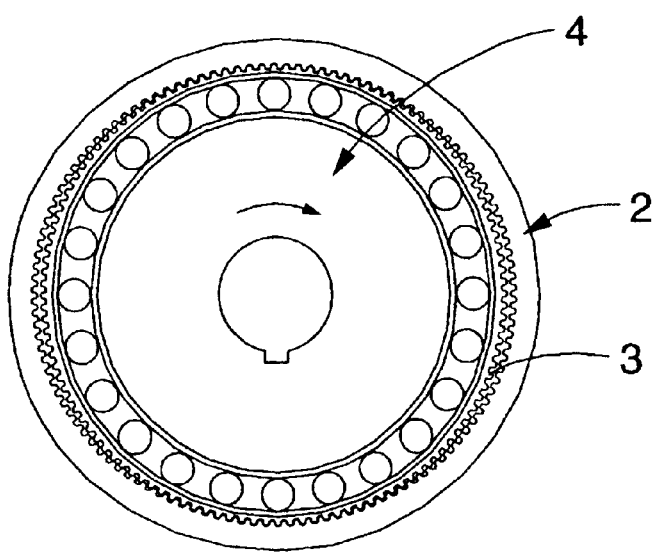
FIG. 2 is a frontal view of the wave gear device of FIG. 1.

FIG. 1 and FIG. 2 are respectively a sectional view and a frontal view showing a cup-shaped wave gear device to which the present invention can be applied. As shown in these drawings, the cup-shaped wave gear device 1 of the present embodiment has a ring-shaped rigid internal gear 2, a cup-shaped flexible external gear 3 that is disposed on an inside of the rigid internal gear 2, and a wave generator 4 that has an elliptical outline and is fitted into the flexible external gear 3.

The cup-shaped flexible external gear 3 is provided with a cylindrical trunk part 31, a ring-shaped diaphragm 32 that extends in a radial direction from the edge of an opening at one end of the trunk part 31, a ring-shaped boss 33 that is integrally formed with an inner circumference of the diaphragm 32, and external teeth 34 that are formed in an outer circumferential surface of an opening at the other end of the trunk part 31. The external teeth 34 can engage the internal teeth 21 of the rigid internal gear 2.

The wave generator 4 has a rigid wave plug 41 that has an elliptical outline and a wave bearing 42 that fits onto an outer circumference of the wave plug 41. The wave bearing 42 has an inner ring 43 that fits onto an outer circumferential surface of the wave plug 41, an outer ring 44 that fits into a trunk part inner circumferential surface 35 of the flexible external gear 3, and balls 45 that are inserted so as to be free to roll between the inner ring 43 and the outer ring 44.

In more detail, the outer ring 44 has an outer circumferential surface 46 that is in frictional contact with the trunk part inner circumferential surface 35 of the external gear 3. The inner ring 43 has an outer circumferential surface in which a ball rolling surface portion 47 having a circular-arc shape in cross section is formed, and the outer ring 44 also has a ball rolling surface 48 having a circular-arc shape in cross section formed in the inner circumferential surface thereof. The wave generator 4 flexes the flexible external gear 3 in which the outer teeth 34 are formed into an elliptical shape so as to engage the external teeth 34 with the internal teeth 21 at positions at both ends of the major axis of the elliptical shape. When the wave generator 4 is rotationally driven by a motor or the like, the difference in the number of teeth between the gears 2 and 3 causes a relative rotation of the gears 2 and 3. This difference in the number of teeth is usually set at two, and the rigid internal gear 2 is usually fixed to a device housing or the like, so that a rotational output of significantly reduced speed is obtained from the flexible external gear 3.

First Embodiment

A cup-shaped wave gear device 1 of the above construction was produced with the friction coefficients of the parts that generate heat, which is to say (i) the tooth surfaces of the gears 2 and 3, (ii) the parts of the external gear 3 and the wave generator 4 that are in frictional contact, and (iii) the parts of the wave generator 4 that are in frictional contact with each other, being suppressed in the following way to similar levels ($\mu=0.1$) as when these parts are lubricated with oil. The wave gear device was also constituted so that the heat generated at these parts is efficiently dissipated via the internal gear 2 and the wave plug 41 that are made of a material with favorable thermal conduction. By doing so, a practical, non-lubricated wave gear device was achieved.

Figure 3:
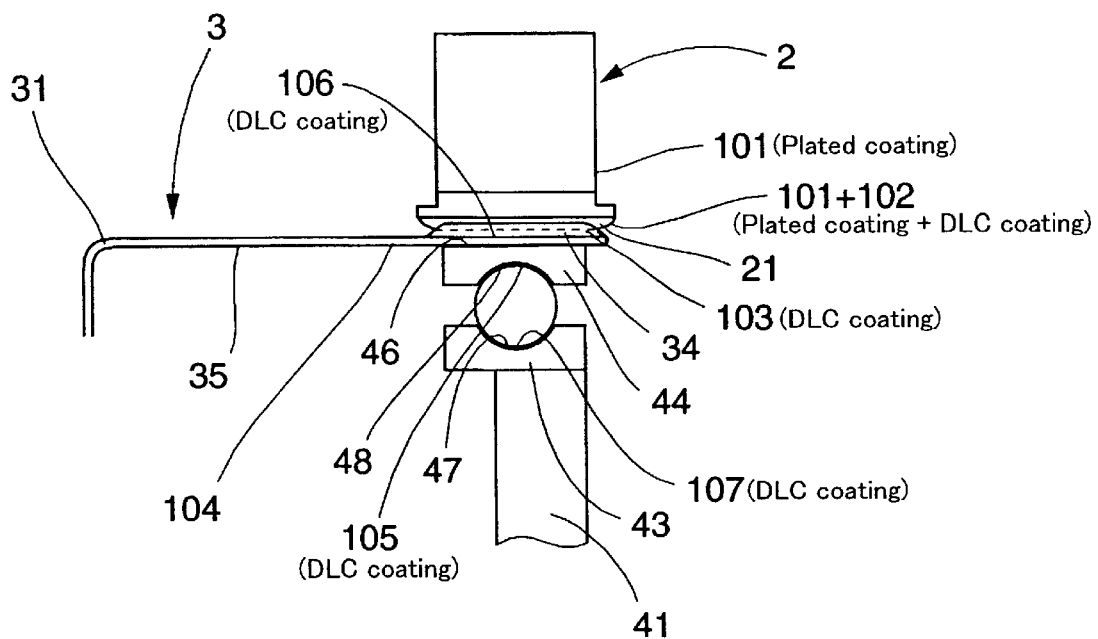
FIG. 3 is an explanatory view showing means for making lubrication unnecessary according to the first embodiment.
Figure 4:
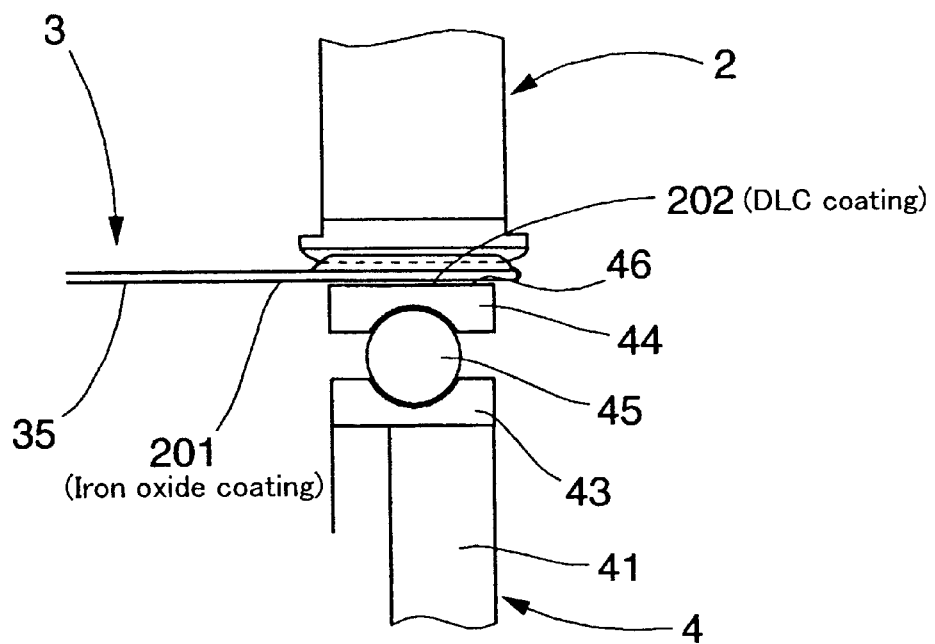
FIG. 4 is an explanatory view showing means for making lubrication unnecessary according to the second embodiment.
Figure 5:
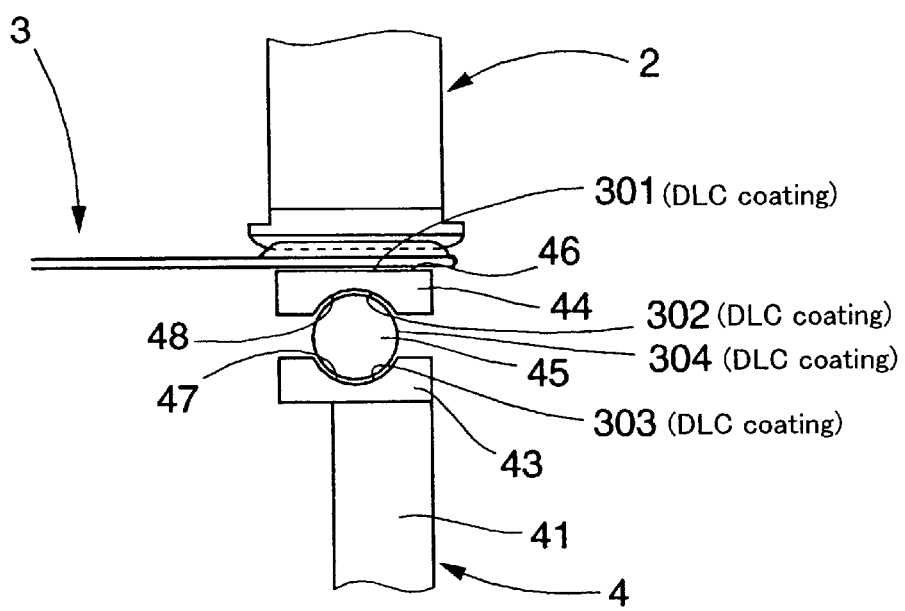
FIG. 5 is an explanatory view showing means for making lubrication unnecessary according to the third embodiment.

As shown in FIG. 3, in the present embodiment the internal gear 2 was formed from a high-strength aluminum alloy or a copper alloy and has a plated coating 101 of a hard material formed on its surface through an electroless plating method. The surfaces (tooth surface parts) of the inner teeth 21 of the internal gear 2 were also subjected to a DLC (Diamond Like Carbon) coating process so that a DLC coating 102 was formed on top of the plated coating 101.

The external gear 3 was formed of structural steel or stainless steel, and a DLC coating 103 was formed on the surfaces (tooth surface parts) of the external teeth 34 using a low-temperature DLC coating process. Also, an oxidized coating formed by a steam treatment, an iron sulfide coating formed by a sulfurizing treatment, or a DLC coating formed by a DLC coating process was formed on an inner circumferential surface part 104, out of the trunk part inner circumferential surface 35 of the external gear 3, that contacts the wave bearing outer ring 44.

The outer ring 44 of the wave bearing 42 of the wave generator 4 was formed of SUJ2, stainless steel, or beryllium copper. DLC coatings 105 and 106 were respectively formed by a DLC coating process on the inner circumferential surface (ball rolling surface) 48 and the outer circumferential surface 46 of the outer ring 44. The inner ring 43 was also formed of SUJ2, stainless steel, or beryllium copper, and had a DLC coating 107 formed by a DLC coating process on its outer circumferential surface (ball rolling surface) 47. The balls 45 were made of a ceramic material ($Si_3N_4$). The wave plug 41 was formed of an aluminum alloy with a low linear expansion coefficient or a copper alloy.

Second Embodiment

In the wave gear device 1, the following construction was used to suppress heat generation and abrasion at the frictionally contacting parts of the trunk part inner circumferential surface of the external gear and the outer circumferential surface of the wave generator (which is to say, the outer circumferential surface of the wave bearing outer ring), these being the parts for which lubrication is especially necessary. By doing so, the friction coefficient was kept to a similar level ($\mu=0.1$) to when these parts are lubricated with oil, so that a practical, non-lubricated wave gear device was achieved.

In the present embodiment, an iron oxide coating 201 with a high self-lubricating property was formed by steam-treating parts of the trunk part inner circumferential surface 35 of the external gear 3 that contact the wave bearing outer ring 44. A DLC coating 202 was also formed by a DLC coating process on the outer circumferential surface 46 of the wave bearing outer ring 44. As a result, coatings with low friction coefficients are present between the external gear 3 and the wave bearing outer ring 44, so that a situation where metal comes into direct contact with metal is avoided. By doing so, abrasion and the generation of heat at the parts in frictional contact can be suppressed in the same way as when the parts are lubricated with oil.

When the external gear 3 is made of a high-strength material, it is preferable for the trunk part inner circumferential surface 35 to be subjected to a nitriding treatment (a nitrocarburizing treatment or an oxynitriding treatment) before the oxidized coating is formed by the steam treatment.

A similar effect is obtained when the steam treatment is replaced with a low-temperature sulfurizing treatment that forms a sulfide coating.

It should be noted that the external gear 3 and the wave bearing outer ring 44 can be made using the materials that were given earlier in the first embodiment.

Third Embodiment

A wave gear device 1 in which the parts of the wave bearing 42 of the wave generator 4 that are in frictional contact with one another and the parts of the wave bearing outer ring 44 and the external gear 3 that are in frictional contact are not lubricated was produced as follows.

The outer ring 44 of the wave bearing 42 was formed of SUJ2 or stainless steel, the inner ring 43 was formed of SUJ2, stainless steel or a ceramic material ($Si_3N_4$), and, like the inner ring 43, the balls 45 were also formed of SUJ2, stainless steel or a ceramic material ($Si_3N_4$). To efficiently dissipate the heat generated at the wave bearing rolling surfaces 47 and 48, the wave plug 41 was formed of a copper material with favorable thermal conduction or an aluminum material.

DLC coatings 301 and 302 were respectively formed by a DLC coating process on the outer circumferential surface 46 and the inner circumferential surface (ball rolling surface) 48 of the outer ring 44. A DLC coating 303 was also formed by a DLC coating process on the inner circumferential surface (ball rolling surface) 47 of the inner ring 43. A DLC coating 304 was also formed by a DLC coating process on the outer circumferential surfaces of the balls 45.

When SUJ2 is used, the tempering temperature is low, so that it is preferable for the temperature used during the DLC coating process to be 100° C. or below. A normal DLC coating has a hardness of between Hv1000 and Hv1500. If a harder DLC coating is formed, which is to say a DLC coating with a hardness of between Hv2000 and Hv8000, for example, it is preferable to subject the surfaces of the members to a nitrocarburizing treatment so as to produce an intermediate layer, thereby forming a hardness gradient across the surface layers of the members.

Since the outer and inner circumferential surfaces 46 and 48 of the outer ring 44 of the wave bearing 42, the balls 45, and the outer circumferential surface 47 of the inner ring 43 are provided with a DLC coating with a low friction coefficient, these parts of the wave bearing 42 no longer need to be lubricated, and the contacting parts of the wave bearing outer ring 44 and the trunk part inner circumferential surface 35 of the external gear 3 also do not need to be lubricated. Especially favorable results are achieved when the balls and the inner ring 43 are made of a ceramic material.

Fourth Embodiment

According to experiments conducted by the inventors of the present invention, the properties required for the various components of the wave gear device are as follows.

It is preferable for the entire rigid internal gear to have a predetermined rigidity, thermal conductance, machining precision, and fastening strength, and for the internal teeth of the rigid internal gear to have a predetermined abrasion resistance and a low friction coefficient, in addition to an adhesive property.

It is preferable for the entire flexible external gear to have a predetermined fatigue strength, machining precision, abrasion resistance and fastening strength, and for the external teeth of the flexible external gear to have a predetermined abrasion resistance and a low friction coefficient, in addition to an adhesive property. It is also preferable for the inner circumferential surface of the flexible external gear to have abrasion resistance and a low friction coefficient, in addition to an adhesive property.

The wave generator needs to generate little heat and to have abrasion resistance and high rolling fatigue strength.

In view of the above, a non-lubricated wave gear device was manufactured according to the following conditions. Favorable results were obtained.

The rigid internal gear was manufactured of aluminum alloy, and a 10 μm electrolessly plated coating was formed on all surfaces of the rigid internal gear. A DLC coating that was no thicker than 1 μm was formed on the surfaces of the internal teeth. In view of the adhesion with the plated coating and the hardness gradient, this DLC coating was formed with a processing temperature of between 350 and 450° C.

The flexible external gear was manufactured of stainless steel, and a DLC coating that was no thicker than 1 μm was formed on the surfaces of the external teeth. The inner circumferential surface of the flexible external gear was annealed to homogenize the surface. The DLC coating was formed with a processing temperature of 100° C. or below to reduce the residual stress.

The wave generator was manufactured from an aluminum alloy, the outer ring of the wave bearing was manufactured from stainless steel, and a DLC coating that was no thicker than 1 μm was formed on the outer circumferential surface and the track surface parts of the inner circumference. The balls were manufactured from a ceramic material. The inner ring was also made of stainless steel, and a DLC coating that was no thicker than 1 μm was formed on the track surface parts. The DLC coating on the outer circumferential surface of the outer ring and the track surface parts of the outer ring and inner ring was formed with a processing temperature of 200° C. or below which is below the tempering temperature of the material.

As described above, a wave gear device of the present invention has an internal gear made of a high-strength aluminum alloy or a copper alloy, and an external gear made of structural steel or stainless steel. A plated coating of a hard material is formed on the tooth surfaces of the internal gear by an electroless plating process, and a DLC coating is laminated on the surface of this plated coating by a DLC coating process. A DLC coating is formed on the tooth surfaces of the external gear by a low-temperature DLC coating process. With the present invention that is produced in this way, the engaging parts of the tooth surfaces of the internal gear and external gear do not need to be lubricated.

Also, with another wave gear device of the present invention, the outer ring of the wave generator is made of SUJ2, stainless steel, or beryllium copper, and an oxidized coating formed by a steam treatment, a DLC coating formed by a DLC coating process, an iron sulfide coating formed by a sulfurizing treatment, or an iron oxide coating formed by a steam treatment and a nitriding treatment is formed on an inner circumferential surface of the external gear. A DLC coating is formed by a DLC coating process on the outer circumferential surface of the outer ring. When this construction is used, the parts of the outer ring and the wave generator that are in frictional contact do not need to be lubricated.

With yet another wave gear device of the present invention, the rolling parts of the wave bearing of the wave generator are made of a ceramic material, stainless steel, or SUJ2, and the inner ring of the wave generator is made of SUJ2, stainless steel, beryllium copper, or a ceramic material. A DLC coating is formed by a DLC coating process on the rolling surface part of the inner circumferential surface of the outer ring. DLC coatings are also formed by a DLC coating process on the rolling surface part of the outer circumferential surface of the inner ring and on the surfaces of the rolling parts. By using this construction, it is possible to produce a wave bearing that does not need to be lubricated. When the aforementioned parts of the wave bearing are lubricated with oil, the agitating resistance of the lubricant is responsible for the majority of the power loss ratio of the wave gear device, so that if the need to lubricate such parts can be removed, a large decrease can be made in the power loss ratio.

If the wave plug is formed of an aluminum alloy with favorable thermal conductance or a copper alloy, the heat generated at the rolling surfaces of the wave bearing can be efficiently dissipated to the periphery.

What is claimed is:

1. A lightweight wave gear device, comprising:

a ring-shaped rigid internal gear;

a ring-shaped flexible external gear; and a wave generator for flexing the external gear in a radial direction to partially engage it with the internal gear, and for moving engaging parts of the internal gear and the external gear in a circumferential direction, wherein the internal gear is made of a high-strength aluminum alloy or a copper alloy, the external gear is made of structural steel or stainless steel, the internal gear is formed on tooth surfaces thereof with a plated coating of a hard material by electroless plating and a DLC (Diamond Like Carbon) coating that is laminated on a surface of the plated coating by a DLC coating process, and the external gear is formed on tooth surfaces thereof with a DLC coating by a low-temperature DLC coating process.

2. A wave gear device according to claim 1, the wave generator includes a rigid wave plug and a wave bearing that is fitted between an outer circumferential surface of the wave plug and an inner circumferential surface of the external gear, the wave bearing has a flexible outer ring whose outer circumferential surface contacts the inner circumferential surface of the external gear, an inner ring whose inner circumferential surface contacts the outer circumferential surface of the wave plug, and a plurality of rolling bodies that are inserted between the outer ring and the inner ring and are free to roll, the outer ring of the wave bearing is made of SUJ2, stainless steel, or beryllium copper, the external gear is formed on an inner circumferential surface thereof with one of (i) an oxidized coating formed by a steam treatment, (ii) a DLC coating formed by a DLC coating process, (iii) an iron sulfide coating formed by a sulfurizing treatment, and (iv) an iron oxide coating formed by a steam treatment and a nitriding process, and the outer ring is formed on an outer circumferential surface thereof with a DLC coating by a DLC coating process.

3. A wave gear device according to claim 2, wherein the rolling bodies are made of a ceramic material, stainless steel, or SUJ2, the inner ring of the wave generator is made of a SUJ2, stainless steel, beryllium copper, or a ceramic material, the outer ring is formed on an inner circumferential surface thereof with an outer-side rolling surface portion, the outer-side rolling surface portion being formed with a DLC coating by a DLC coating process, the inner ring is formed on an outer circumferential surface with an inner-side rolling surface portion, the inner-side rolling surface portion being formed with a DLC coating by a DLC coating process, and each of the rolling bodies is formed on a surface thereof with a DLC coating by a DLC coating process.

4. A wave gear device according to claim 3, wherein the wave plug is made of an aluminum alloy or a copper alloy.

5. A wave gear device according to claim 1, the wave generator includes a rigid wave plug and a wave bearing that is fitted between an outer circumferential surface of the wave plug and an inner circumferential surface of the external gear, the wave bearing has a flexible outer ring whose outer circumferential surface contacts the inner circumferential surface of the external gear, an inner ring whose inner circumferential surface contacts the outer circumferential surface of the wave plug, and a plurality of rolling bodies that are inserted between the outer ring and the inner ring and are free to roll, the outer ring of the wave bearing is made of SUJ2, stainless steel, or beryllium copper, the rolling bodies of the wave bearing are made of a ceramic material, stainless steel, or SUJ2, the inner ring of the wave generator is made of SUJ2, stainless steel, beryllium copper, or a ceramic material, the outer ring is formed on an inner circumferential surface thereof with an outer-side rolling surface portion, the outer-side rolling surface portion being formed with a DLC coating by a DLC coating process, the inner ring is formed on an outer circumferential surface with an inner-side rolling surface portion, the inner-side rolling surface portion being formed with a DLC coating by a DLC coating process, and each of the rolling bodies is formed on a surface thereof with a DLC coating by a DLC coating process.

6. A wave gear device according to claim 5, wherein the wave plug is made of an aluminum alloy or a copper alloy.

7. A wave gear device, comprising:

a ring-shaped rigid internal gear;

a ring-shaped flexible external gear; and a wave generator for flexing the external gear in a radial direction to partially engage it with the internal gear, and for moving engaging parts of the internal gear and the external gear in a circumferential direction, wherein the external gear is made of structural steel or stainless steel, the wave generator includes a rigid wave plug and a wave bearing that is fitted between an outer circumferential surface of the wave plug and an inner circumferential surface of the external gear, the wave bearing has a flexible outer ring whose outer circumferential surface contacts the inner circumferential surface of the external gear, an inner ring whose inner circumferential surface contacts the outer circumferential surface of the wave plug, and a plurality of rolling bodies that are inserted between the outer ring and the inner ring and are free to roll, the outer ring of the wave bearing is made of SUJ2, stainless steel, or beryllium copper, the external gear is formed on an inner circumferential surface thereof with one of (i) an oxidized coating formed by a steam treatment, (ii) a DLC coating formed by a DLC coating process, (iii) an iron sulfide coating formed by a sulfurizing treatment, and (iv) an iron oxide coating formed by a steam treatment and a nitriding process, and the outer ring is formed on an outer circumferential surface thereof with a DLC coating by a DLC coating process.

8. A wave gear device, comprising:

a ring-shaped rigid internal gear;

a ring-shaped flexible external gear; and a wave generator for flexing the external gear in a radial direction to partially engage it with the internal gear, and for moving engaging parts of the internal gear and the external gear in a circumferential direction, wherein the wave generator includes a rigid wave plug and a wave bearing that is fitted between an outer circumferential surface of the wave plug and an inner circumferential surface of the external gear, the wave bearing has a flexible outer ring whose outer circumferential surface contacts the inner circumferential surface of the external gear, an inner ring whose inner circumferential surface contacts the outer circumferential surface of the wave plug, and a plurality of rolling bodies that are inserted between the outer ring and the inner ring and are free to roll, the outer ring of the wave bearing is made of SUJ2, stainless steel, or beryllium copper, the rolling bodies are made of a ceramic material, stainless steel or SUJ2, the inner ring of the wave bearing is made of SUJ2, stainless steel, beryllium copper, or a ceramic material, the outer ring is formed on an inner circumferential surface thereof with an outer-side rolling surface portion, the outer-side rolling surface portion being formed with a DLC coating by a DLC coating process, the inner ring is formed on an outer circumferential surface with an inner-side rolling surface portion, the inner-side rolling surface portion being formed with a DLC coating by a DLC coating process, and each of the rolling bodies is formed on a surface thereof with a DLC coating by a DLC coating process.

9. A wave gear device according to claim 8, wherein the wave plug is made of an aluminum alloy or a copper alloy.

* * * * *